(12) United States Patent
Rebuli

(10) Patent No.: US 8,509,445 B2
(45) Date of Patent: Aug. 13, 2013

(54) DUPLICATION MEANS FOR AN ELECTRONICALLY CODED KEY AND RELATED METHOD

(75) Inventor: David Rebuli, Trebaseleghe (IT)

(73) Assignee: Keyline S.p.A., Conegliano (IT)

( * ) Notice: Subject to any disclaimer, the term of this patent is extended or adjusted under 35 U.S.C. 154(b) by 363 days.

(21) Appl. No.: 12/813,484

(22) Filed: Jun. 10, 2010

(65) Prior Publication Data
US 2011/0064224 A1    Mar. 17, 2011

(30) Foreign Application Priority Data
Jun. 10, 2009   (IT) ........................ PN2009A000038

(51) Int. Cl.
*H04L 9/00* (2006.01)

(52) U.S. Cl.
USPC .......................................................... 380/277

(58) Field of Classification Search
USPC .......................................................... 370/277
See application file for complete search history.

(56) References Cited

U.S. PATENT DOCUMENTS

| | | | | |
|---|---|---|---|---|
| 5,593,317 A * | 1/1997 | Humbles | ....................... | 439/502 |
| 5,596,317 A | 1/1997 | Brinkmeyer et al. | | |
| 5,838,251 A | 11/1998 | Brinkmeyer et al. | | |
| 6,710,700 B1 * | 3/2004 | Tatsukawa et al. | ........... | 340/5.53 |
| 7,387,235 B2 * | 6/2008 | Gilbert et al. | ................. | 235/375 |
| 2001/0049066 A1 | 12/2001 | Katagiri et al. | | |
| 2004/0078563 A1 | 4/2004 | Kimes et al. | | |

FOREIGN PATENT DOCUMENTS

| | | |
|---|---|---|
| DE | 44 18 069 C1 | 8/1995 |
| EP | 1339024 | 8/2003 |
| GB | 2340644 | 2/2000 |
| GB | 2424293 | 9/2006 |
| WO | WO 2006/032354 | 3/2006 |
| WO | WO 2008/145199 | * 12/2008 |

OTHER PUBLICATIONS

PCT/EP2010/054015—International Search Report, May 6, 2010.
PCT/EP2010/054015—Written Opinion of the International Searching Authority, May 6, 2010.

* cited by examiner

*Primary Examiner* — Kambiz Zand
*Assistant Examiner* — Aubrey Wyszynksi
(74) *Attorney, Agent, or Firm* — Oblon, Spivak, McClelland, Maier & Neustadt, L.L.P.

(57) ABSTRACT

A method for the duplication of original electronic keys used in the road vehicle transport sector provided with coded and encrypted electronic authentication. The method including the steps of intercepting a radio-electric interrogating signal of an encrypted electronic authentication system transmitted between a central processing unit of a vehicle and an original key, decrypting a secret code from a random code at a key duplicating device, performing an interrogation process by transmitting a radio-electric signal including said decrypted secret code from said duplicator, to said original key, receiving a password, transmitted by said original key, at said duplicator in response to the transmission of the secret code, and transferring the password to a blank key.

15 Claims, 11 Drawing Sheets

DUPLICATION MEANS FOR AN ELECTRONICALLY CODED KEY AND RELATED METHOD

CROSS REFERENCE TO RELATED APPLICATIONS

This application claims priority from Italian Patent Application Serial No. PN2009A000038, filed Jun. 10, 2009, which is incorporated herein by reference in its entirety.

This invention relates to certain means for duplicating keys with both traditional type mechanical coding and electronic coding of a type which is in itself also known and has generally been used for some years in various kinds of technical applications.

The invention also relates to certain procedures for using these means and which make it possible to reproduce one of these keys.

Within the rest of this description, and in the attached claims, specific reference will be made to the mechanical and electronic keys used in normal vehicles currently on the market, but it is understood that the invention also applies in general to other applications, such as reinforced front doors, safes, etc., provided a key with twin mechanical and electronic coding is used, as well as a corresponding lock and a corresponding processing unit for processing the data contained within the electronic coding of the key to be duplicated, and transmitted by it.

Finally, note that, even if this point will be superfluous for those who work in the sector, that the invention applies to processing units and keys in which, before the unit provides its consent for the activation of the various functions of the vehicle, a twin and mutual authentication between the electronic key and the unit housed in the vehicle itself is implemented.

The means and procedure for this mutual authentication are described in detail in the following patent:

U.S. Pat. No. 7,387,235 B2: "MUTUAL AUTHENTICATION SECURITY SYSTEM WITH RECOVERY FROM PARTIAL PROGRAMMING," assigned to the Lear Corporation.

It is for this reason, in fact, that the original key and, therefore, the duplicated key, have a twin code for reciprocal authentication, one called "secret code," the other called PASSWORD.

One of these codes, in fact, is used by the unit to recognize the original key and the other code is used by the original key to recognize the unit.

In addition, to introduce sector experts to the technology for electronic keys with mutual authentication more easily, we refer to FIG. 6, of this priority patent, which described a mutual authentication procedure between an electronic key and the relative processing unit, which is activated when the key is inserted in its lock and turned until it triggers an opportune "start" signal for the unit itself; on the basis of this figure, an expert can certainly identify the technique sector involved and, therefore, easily understand the field of application of this invention and its innovations with respect to the methods industry.

It is known that when one wishes to or has to legitimately duplicate a key of the type described, that is, a mechanical and electronic key, various different aspects must be considered.
1) Without a doubt, the first aspect is security; a person who legitimately requests a duplicate of a key he/she owns must be sure that the duplication and, possibly, the delivery/transmission of the duplicated key is possible without said duplicated key being intercepted and stolen by third parties and without the data required to produce the duplicated key being intercepted and decoded by third parties;
2) The second aspect is the rapidity and affordability of the key duplication service; a duplication request is usually urgent because the user has lost one of the keys he/she had or must supply one or more additional keys to people they trust, like relatives, colleagues, etc.
3) The third aspect is the real feasibility and practicality of the duplication service; that is, it is preferable that the duplication service is actually available in an indeterminate number of stations for the duplication of these types of keys, preferably distributed throughout the territory in which the vehicle normally circulates, so that the user who wishes to duplicate a key can very easily and quickly access one of these stations and can as easily and quickly obtain the required duplicate of an original key which must, therefore, be delivered physically to the center itself.

Various methods and means for the duplication of electronic keys are known; these means and methods are described in great detail in several patents or relative patent requests, such as the following:
 a) U.S. Pat. No. 5,838,251 A,
 b) US 2004/078563 A1,
 c) EP 1 339 024 A,
 d) WO 2006/032354,
 e) GB 2 340 644 A,
 f) PCT/EP2007/060856, (same filing party),
 g) US 2001/049066 A1.

All these means and procedures require, for the duplication of an electronically coded key, a sole center for saving and processing codes for a large number of keys of the type considered, and telematic means, typically on-line (Internet), which are used to send and receive information to and from a local station which must physically create and deliver the duplicated key and which the user contacts, to and from said saving, processing and coding/decoding center.

The teachings and information presented in these documents are generally easy to implement and some are used effectively.

However, all of them have a common problem which, in fact, limits their ease of use and rapidity and, definitively, renders then less practical; this common problem consists of the fact that the duplication of the key requires the following:
 a) the availability of a center, usually a remote center, which can receive, process and produce the codes required to produce the duplicated key requested, and
 b) telematic transmission and reception means for coded data, from the local station to said processing center, and vice versa.

These requirements naturally imply the existence and functioning of a specific organization, trained and coordinated personnel, distributed throughout the territory, and specific procedures which must be carried out by this personnel at both the local station and the processing center.

Obviously, all of this implies increased operating complexity and organizational constraints of various kinds which are, definitively, less secure and convenient for a user who merely wants his/her key to be duplicated easily, without depending on either remote external centers or telematic transmission and reception systems for coded data.

It would be ideal, therefore, to create a procedure for the duplication of electronic keys which eliminates the problems described, that is easy and safe to carry out and that can be carried out with the prior means available; and this is the main purpose of this invention.

This and other purposes are fulfilled by a procedure in accordance with the attached claims.

The characteristics and advantages of the invention will be clear from the description that follows, which is provided as a non-limiting example, with reference to the attached designs, in which.

With reference to FIGS. 1A to 1D, the invention procedure uses the following means:

A) an original key 1, which must be duplicated, containing the following:
- a memory which can contain a secret code, a Password and ID identification code,
- a transponder which includes an opportune algorithm, in itself already known,
- a logical or calculation unit,
- other devices, in themselves already generally known, which make it possible to transmit, receive and modulate/demodulate the radio-electric signals transmitted and received,
- other electronic devices, in themselves well known, which permit the regular functioning of the parts described above, such as transmitting, receiving and modulating/demodulating the radio-electric signals transmitted and received.

Figure 1A:
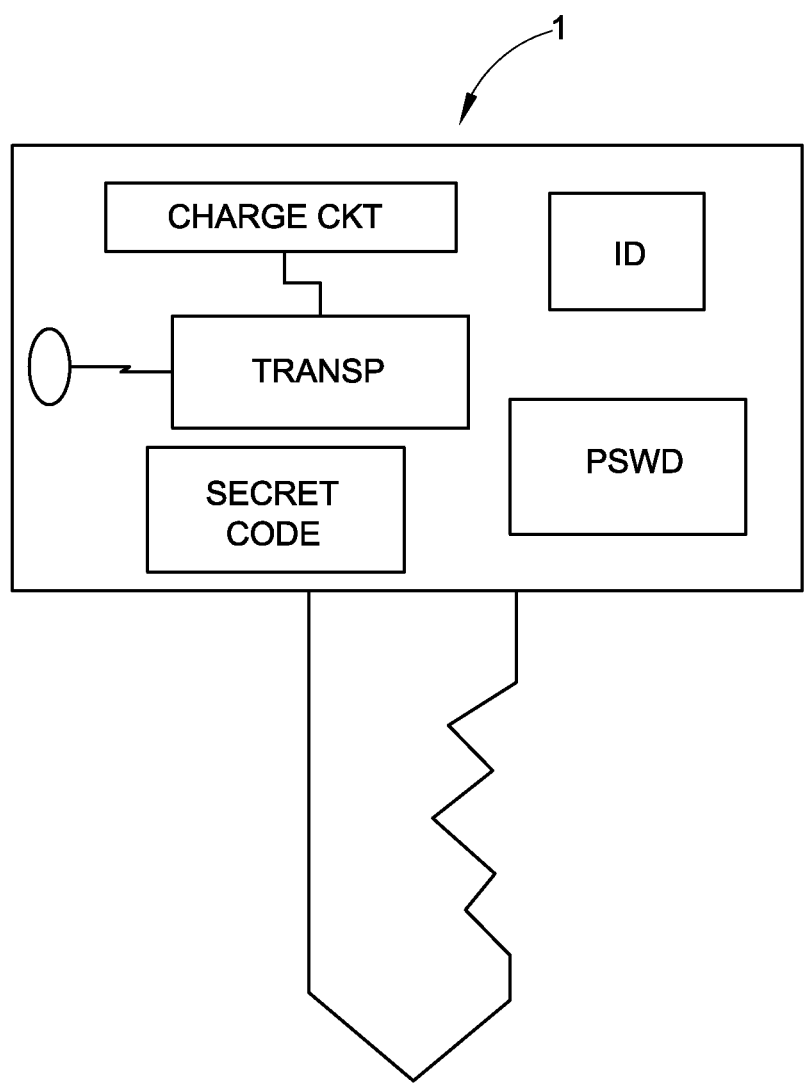
FIGS. 1A, 1B, 1C and 1D represent respective means which must be activated or used in the invention, illustrating, in a simplified and symbolic manner, their nature and content, both hardware and software, taking part in the invention procedure.
Figure 1B:
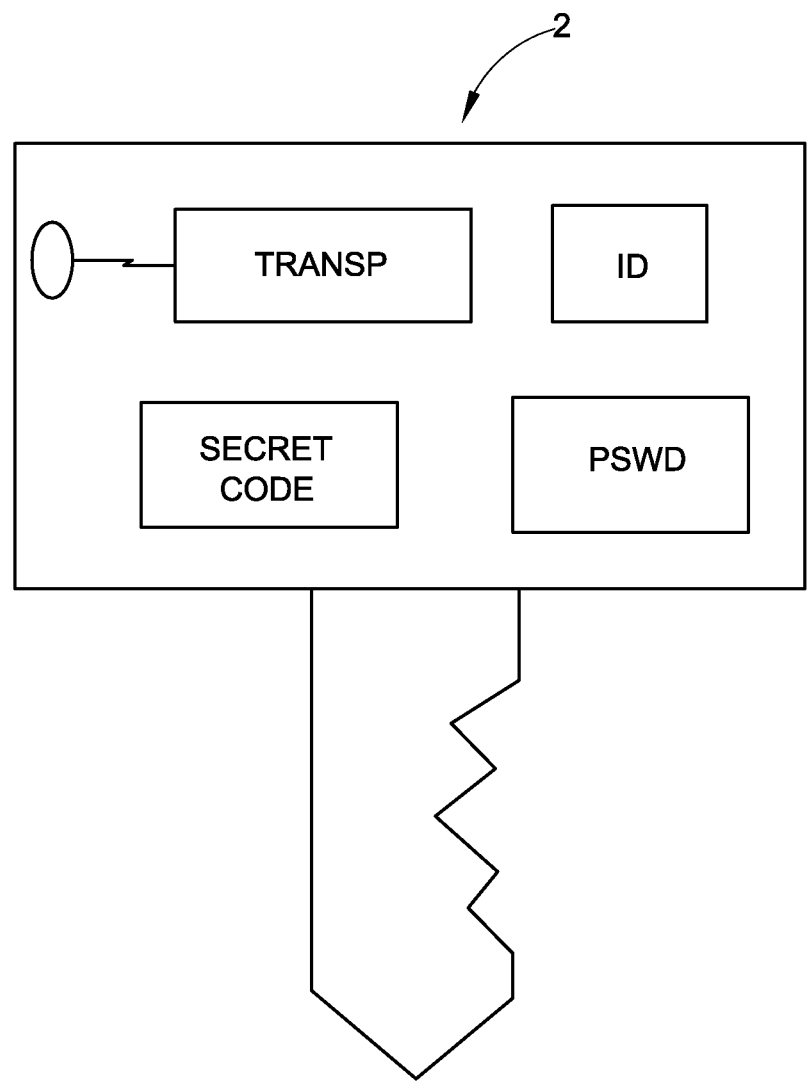
Figure 1C:
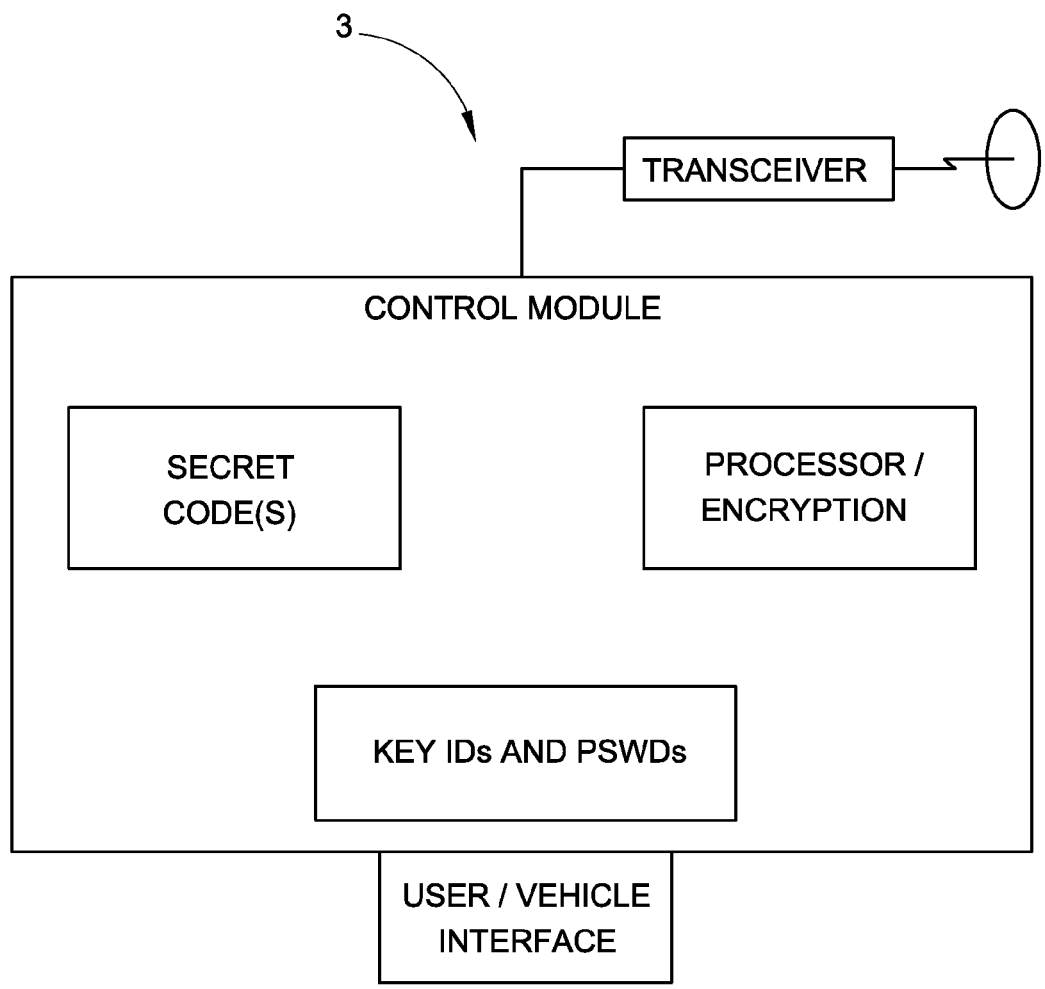
Figure 1D:
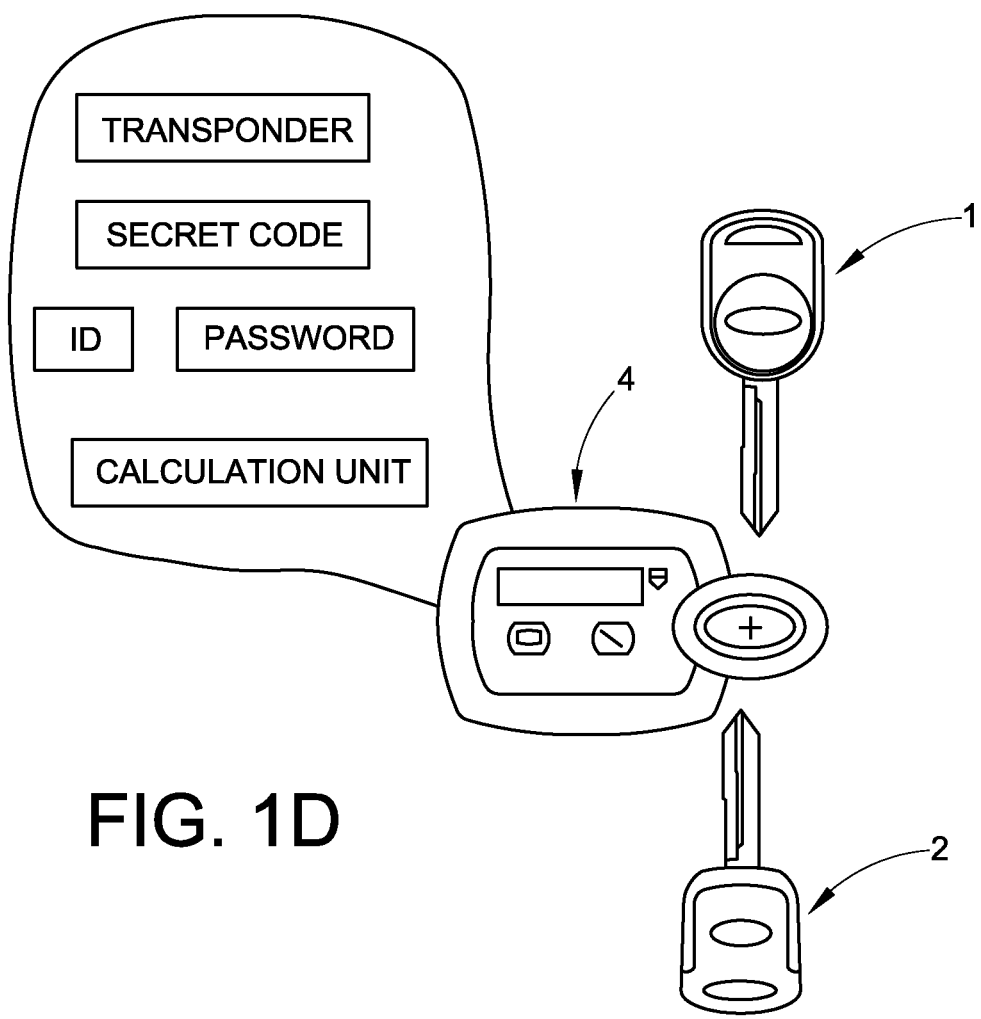
Figure 1E:
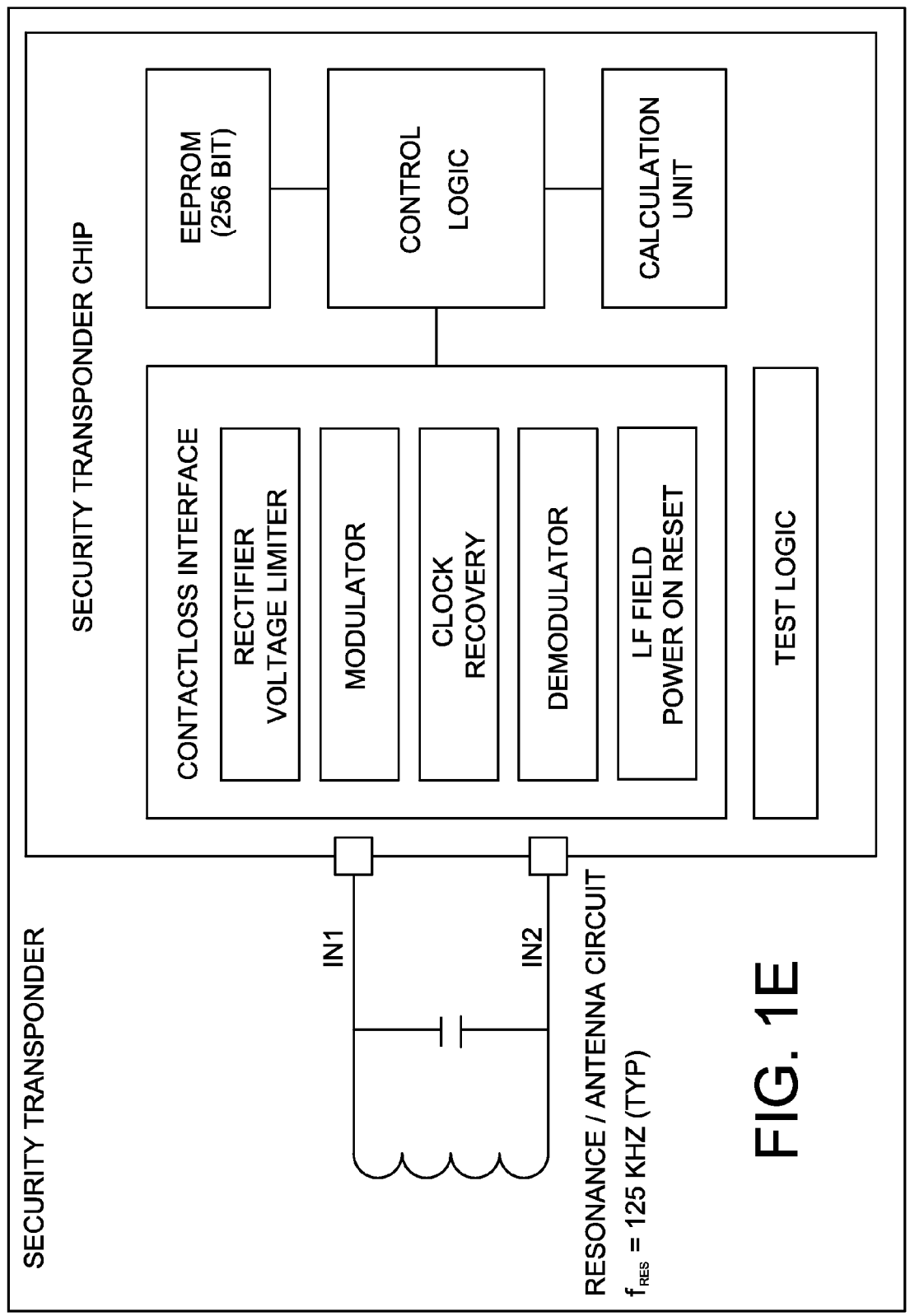
FIG. 1E and FIG. 1F illustrate, respectively, in simplified form, the logical block diagram for the various parts and devices included in the original key and in the processing unit of the vehicle.
Figure 1F:
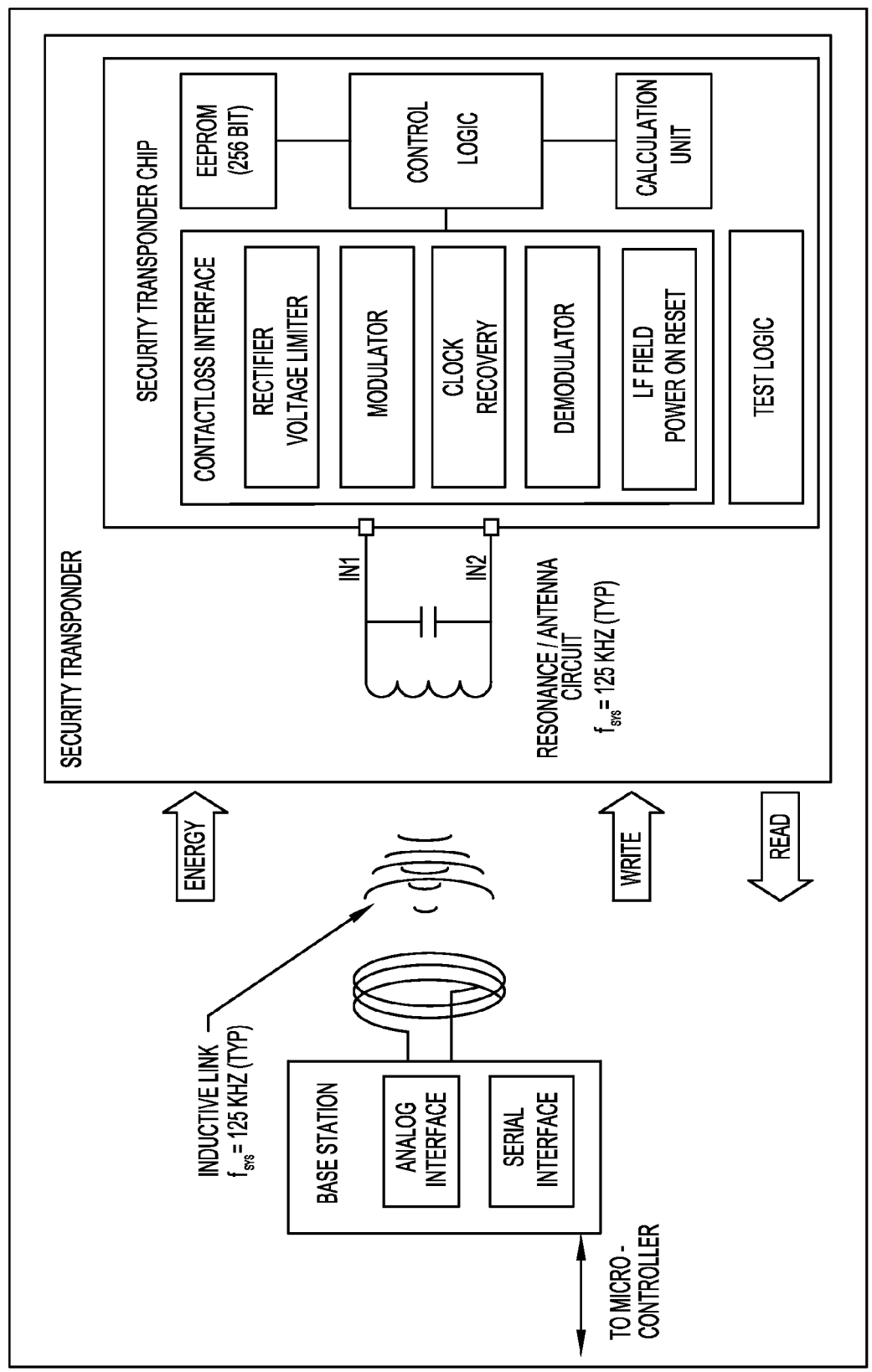

While FIGS. 1A to 1D describe, in preferential mode, the content of the parts which have an essential function for the functioning of the invention, FIG. 1E and FIG. 1F illustrate, in particular, the construction and circuit content of the key and the processing unit installed in the vehicle and which are necessary for the functioning of the parts just defined.

These parts and devices have already been for some time fitted for use in vehicles in circulation and, therefore, are not an innovation, but represent without exceptions the noted method and also do not require any particular explanation because sector technicians can perfectly and immediately recognize the type of construction and the relative functioning.

B) a blank key 2; said blank key includes the same electronic devices and parts as the original key 1, except that, logically, it does not contain its own codes to permit the functioning of the blank key itself, that is, the secret code, the ID and the Password; however, the algorithm, identical to the one installed in the original key, and already known, is already installed in the blank key 2; in addition, logically, the blank key 2 has a mechanical profile, of a type in itself known, for permitting the introduction of the key itself in the vehicle lock and acting on said lock exactly like the original key;

C) the vehicle or processing unit 3 with which the original key 1 is used and which must use the duplicated key 2, includes parts and devices which essentially carry out the same function as the original key 1, that is
- a memory which can contain a secret code, a Password and ID identification code,
- a transponder which includes an opportune algorithm, in itself already known,
- a logical or calculation unit,
- other devices, in themselves already generally known, which make it possible to transmit, receive and modulate/demodulate the radio-electric signals transmitted and received, In addition, said processing unit 3 contains transmission parts which can transmit a sufficiently-powerful radio-electric signal to the original key inserted in the vehicle lock, in order to start the mutual authentication procedure between original key and processing unit itself.

D) as duplicator device 4, whose composition and functionality are still in principle similar to those of the blank key 2, and which, therefore, for the sake of brevity, will not be explained again.

Note, however, that said duplicator has the same algorithm as that present in the two keys 1 and 2, and an especially powerful and fast calculation unit, whose function will be explained below.

As for the duplicator 4, the type is in itself known and generally illustrated in Patent (request) No. PCT/EP2007/060856, described therein as "reading/writing unit 13."

It, therefore, acquires data which is encrypted at random into a first encryption form.

It contains, therefore, the following:

a) an internal memory and a reading key and a key for writing the code contained in said internal memory, b) a small antenna for receiving a radio-electric signal containing a code, to transfer said code to the internal memory and, at a precise command on the writing key, to re-transmit externally this code saved internally, c) calculation means with a special design and creation for very fast processing of the encrypted secret code and very reliable and safe identification of the secret code after decryption.

E) a device for receiving the electromagnetic signals coming from the processing unit 3 of the vehicle, to be referred to hereinafter as sniffer 5.

Said sniffer 5 is a reception device for a radio-electric signal containing one or more codes, for saving these codes without any processing of them, and re-sending them, at another precise command sent to it, to said duplicator 4.

It will also be evident that the sole function of the sniffer 5 is to intercept the signal coming from the processing unit 3, to save it and to transfer it, at a command of the duplicator 4, to the same duplicator 4 which saves it in its special memories.

The invention procedure is based on the following strategy: to sum it up very briefly, this strategy is based on the "intercepting" of a part of the dialog between the processing unit and the original key, the "replacement" of the unit itself by an opportune means (the duplicator 4 which is, therefore, made able to perfectly emulate the unit 3), the interrogation, for the second time, of the original key, to also "capture" the final part of its information, and, then, the transfer of all the information to the blank key.

To sum up, now moving on to the operating methods, in order to duplicate the blank key, the original key is "interrogated," so to speak; this interrogation is obtained by inserting it in the vehicle lock.

(For the sake of brevity, here we omit the step involving the authentication of the ID of the original key by the processing unit 3; however, this phase will be reported in the complete sequence of the operating phases, which is reported and explained in detail below)

In this way, the unit 3, in a way which is in itself known, transmits a radio-electric interrogation signal, opportunely coded and encrypted by the algorithm present within it; this encrypted interrogation signal, sent to the original key, is, however, also received by the sniffer 5.

The sniffer intercepts the communications between the original key and the unit, that is:
the interrogation code transmitted by the unit, and
the secret code transmitted as a response by the original key.

The sniffer 5, however, only saves the encrypted code coming from the unit 3, and ignores the encrypted response code coming from the original key 1.

Immediately afterwards, the sniffer 5 "transfers" this information to the duplicator.

At this point, the duplicator 4, already containing the same algorithm from the start, is also provided with the processing unit 3 interrogation code.

The duplicator 4 is then made able to make a very complex and relatively long mathematical calculation, in order to use the algorithm contained in it to decrypt the secret code from the encrypted signal generated by the unit 3.

This complex processing is based on specific mathematical functions, in themselves known to sector experts, and must be carried out by adequate processing means, which may be both included within the duplicator 4 itself or created as external means, which may be connected in an opportune manner to the duplicator 4 itself; however, this type of solution is not included in this invention and, therefore, will not be detailed any further.

However, it is possible just one interrogation of the processing unit may generate an encrypted signal which could be insufficient for identifying the real secret code of the unit with a high level of reliability; therefore, a good way to perfect this procedure is to activate the original key in its lock many times in succession, in order to receive a corresponding number of encrypted signals from the unit which are different from each other but which can all, if decrypted in an opportune manner, provide all the information required to identify the exact secret code.

Clearly, it is only possible to activate the processing unit 3 once, the unit responds, therefore, with just one decrypted coded signal; however, this signal might be insufficient for the decoder 4 to identify the secret code unambiguously. Therefore, it is a good idea to activate the unit 3 many times in succession. In practice, this means carrying out, at the start of the procedure, a series of consecutive rotations of the original key in its lock, which provokes a corresponding number of response signals from the unit which, recorded accordingly by the sniffer 5, are all transferred to the decoder 4.

After processing the encrypted codes received, the duplicator 4 then identifies the secret code of the unit 3 and saves it in its memory.

Inserting the original key 1, then, in the duplicator 4, the key, interrogated accordingly by the duplicator, which sends the secret code of the unit 3, now known and duly encrypted with the algorithm, responds as if it received the signal from the unit 3, as it receives the same signal, so it "believes" it is being interrogated by the unit and, therefore, responds by transmitting its own PASSWORD.

At this point, the duplicator is also informed about the PASSWORD of the original key and can, therefore, save it and transfer it to the blank key, which is then (as the final operation) inserted in the duplicator 4.

In substance, the invention strategy is based on "intercepting" the exchange of certain information (ID identification number and secret code) between the original key and the vehicle processing unit, saving this information and transferring it to a special memory means, the duplicator.

The duplicator can encode the secret code of the unit and, therefore, simulate the functioning of this unit; thus, interrogated by the original key, it also receives the PASSWORD from this key.

The duplicator, consequently, is informed about the secret data of the original key, that is: ID, secret code and PASSWORD.

Finally, all this information is transferred from the duplicator to the blank key which, therefore, acquires all the original key information.

Figure 2:
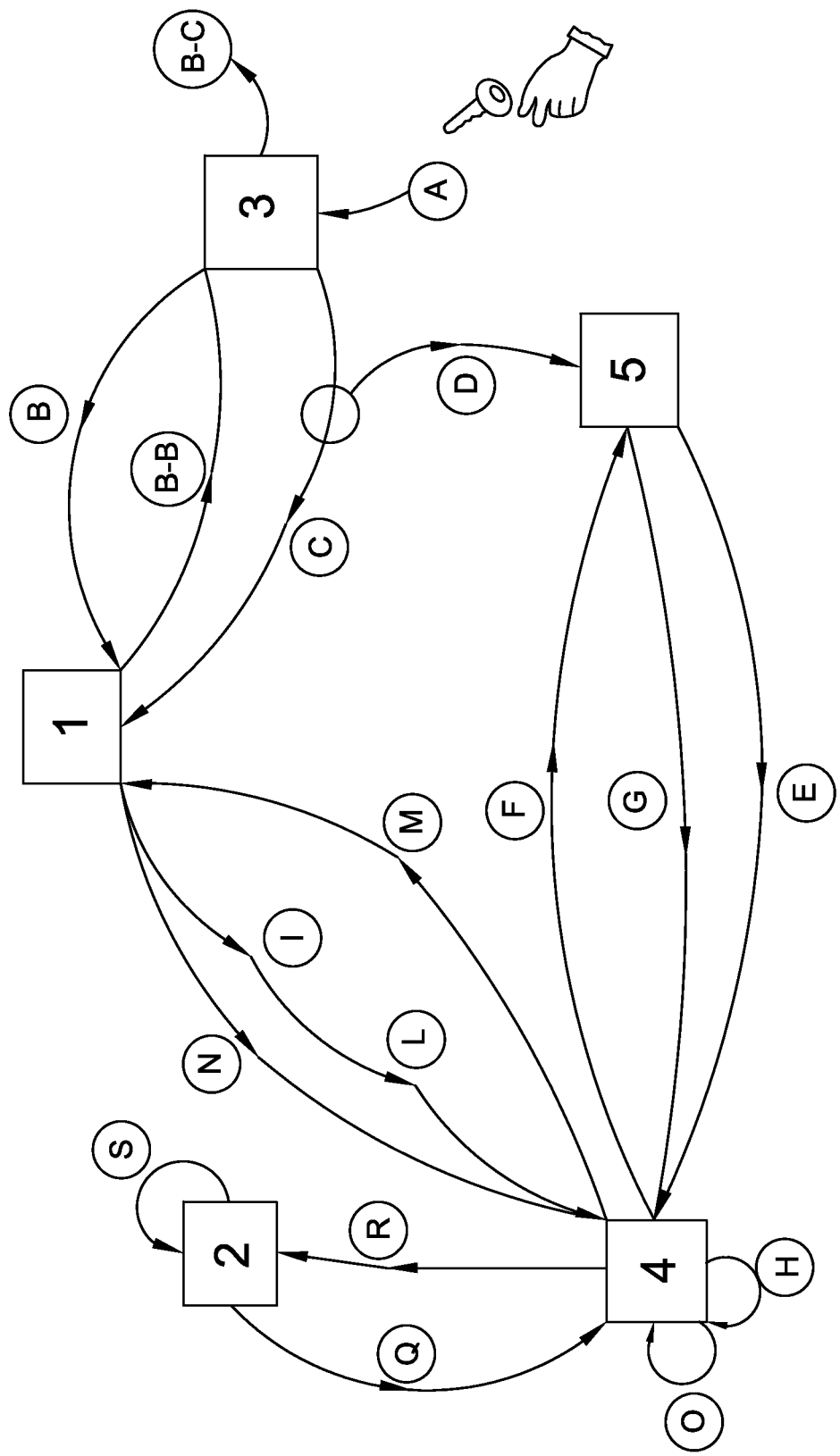
FIG. 2 illustrates a block diagram for the flow of the various phases of the procedure in accordance with an invention principle method.

With reference to FIG. 2, the operating procedure of the invention, represented in detail using a block flow diagram, is the following:

Step A) the original key is inserted in the vehicle lock and is rotated as far as the point at which it closes an electric circuit, which activates the vehicle processing unit; preferably, this rotation of the original key and, therefore, the corresponding activations of the processing unit 3, are more than one and are carried out in succession.

It has also been checked and found that the optimal number for acquiring a sufficient quantity of encrypted codes, which may then be safely decrypted by the decoder 4 to obtain the secret code, is three activations/rotations of the original key in the corresponding lock.

It is, in fact, clear or obvious that the more information you have about a certain condition or event, the higher chance you have of representing this condition correctly and of avoiding identification errors.

Step B) the processing unit transmits a radio-electric signal including an identification request code for the original key, that is, the ID, which is an "open" code;

Step B-B) the original key receives the "open" ID request signal and transmits said ID code to the unit 3;

Step B-C) the unit receives said open ID code and compares it with a corresponding ID code saved previously internally; if it recognizes it, this authentication authorizes the continuation of the procedure;

Step C) the procedure continues: the unit 3 sends a random code encrypted by the algorithm which includes the secret code to the original key 1;

Step D) an intercepting device 5 (sniffer), positioned close to the original key, intercepts the radio-electric signal which contains the ID of the original key, the interrogation of the unit and the response of the key, that is, its secret code in encrypted form; however, this latter code is not saved, and the sniffer only records and saves the interrogation of the unit 3 (the positioning of the sniffer 5 close to the vehicle lock is preferable before inserting the original key);

Step E) said sniffer 5 is inserted in said duplicator device 4,

Step F) said duplicator 4 emits a radio-electric signal which triggers said sniffer 5;

Step G) said sniffer 5 sends said duplicator a radio-electric signal with the random code encrypted by the algorithm which includes the secret code, saved during Step D);

Step H) the duplicator 4 saves the random code generated by the processing unit (3) and, using a series of mathematical functions and opportune calculation means, decrypts said encrypted code, obtaining the secret code required, At this point, the duplicator contains the secret code, now decrypted, of the original key 1, Step I) the sniffer 5 is removed from the duplicator 4;

Step L) the original key is inserted in the duplicator;

Step M) the duplicator interrogates the original key with an opportune radio-electric signal which contains the secret code encrypted by its algorithm, thereby emulating the functioning of the processing unit;

Step N) the original key responds by transmitting a new code of its own, that is, encrypted the PASSWORD;

Step O) the duplicator saves said PASSWORD;

Step P) the original key is removed from the duplicator;

Step Q) the blank key is inserted in the duplicator;

Step R) the duplicator transmits a radio-electric signal to said blank key, therefore, sending it the Password, the secret code and the ID;

Step S) the blank key saves all said 3 codes within a defined memory.

In this way, the duplication of the blank key is completed.

We now focus on a useful perfection of the procedure, which permits a certain simplification: if, in fact, in Step D), or the intercepting phase, the sniffer 5 also intercepts and saves the secret code of the original key, Steps M) and N) would no longer be required, given that the secret code transmitted by the original key has already been transmitted to the sniffer 5 and, therefore, transmitted by the sniffer to the duplicator 4, which could immediately emulate the processing unit 3 to immediately interrogate the original key in order to get it to send it the relative Password.

However, this procedural simplification creates the risk that, because the signal which carries the secret code of the encrypted key is very weak, as it is emitted by the original key which, as is known, is only powered by the radio-electric signal generated by the processing unit, this signal which carries the encrypted secret code may easily be disturbed or, in any case, may be received in an incomplete or incorrect manner which, clearly, would interrupt the current key duplication procedure.

Also note that some of the phases described above are manual type phases which an external operator must apply to the means described, such as inserting a key and turning it in the lock, taking out a key, activating the duplicator, moving the sniffer, etc. . . . , while the other phases are automatic phases which are carried out by these means in a known manner.

To be more specific, the manual phases are Steps A), E), I), L), P), Q).

Steps B-C), H), O), S) are pure processing/comparison/saving phases within individual devices, without any relation to the other devices and, therefore, are illustrated in a symbolic manner.

Step D) relates to the intercepting action of the sniffer 5 which, however, must be positioned manually close to the lock. It is intended, therefore, that the positioning of the sniffer 5 requires an additional operation which is not considered as a true operating phase here.

Looking closely at FIG. 2, the nature of the procedure strategy is clear, even just visually; in fact, initially, the original key 1 and the processing unit 3 are related to each other (Steps A and B) in order to get the unit to recognize and save the content of the codes present in the original key; subsequently, these codes are intercepted by the sniffer 5 (Steps C and D), which transmits them to the duplicator 4 (Steps E, F and G).

At this point, the original key 1 is also inserted in the duplicator 4 (Phases I, L), which interrogates this original key (Steps M, N) in order to obtain a response with the PASSWORD (Steps M, N).

Definitively, after Step P), the duplicator 4 contains all the coded information originally contained in the original key 1, so it is now possible to insert the blank key 2 and transfer all this coded information to it.

This solution, which is safe and effective, and certainly innovative, permits, therefore, complete duplication of a blank key starting with an original key, using the "mutual authentication" technique, without having to connect to any database positioned remotely and only accessible with on-line means to guarantee the security of the transfer of the codes.

However, this procedure requires the presence and functioning of the sniffer 5; this constraint, unfortunately, creates its own disadvantages: the presence of the sniffer 5, in fact, introduces critical elements because it has to work with radio-electric signals which may be received incorrectly. Therefore, there may be errors with the transmission of the information or codes. In addition, the operations with the sniffer are delicate and precise operations which have to be carried out very carefully and in the right sequence; all of this may create problems within an operating environment where skill levels are low and there is a poor understanding of the substantial technical sophistication of the means and procedures adopted.

This constraint is often problematic, also because it increases costs and makes the duplication procedure more complex.

In order to do away with these problems, the following is a description of a procedure which makes it possible to duplicate an original key without using the sniffer.

The strategy for this perfection consists of the fact that the blank key is used as a sniffer, in the sense that it is used so that the codes of the processing unit are inserted in the duplicator.

However, to be able to use the blank key as a "vector" for this information, the blank key must be loaded in advance with the ID of the original key.

To do this, the duplicator is used as a means for the transfer of the ID from the original key to the blank key; the blank key, when it has been loaded with the ID, is used to receive the secret code from the processing unit of the vehicle and save it; this secret code, then, may be acquired, in encrypted form, by the blank key itself.

Note here that the secret code is, clearly, the same for both the processing unit 3 and the original key 1; this could not be otherwise, in fact, as if it was, mutual authentication would not be possible.

The blank key, therefore, can transfer the secret code, still encrypted, to the duplicator, which decrypts the secret code using opportune calculation means and sophisticated mathematical techniques.

These calculation means and these mathematical techniques are in themselves easy to deduce from the known methods and are generally known to sector experts so they do not need to be repeated here.

The duplicator is now informed about the secret code of the processing unit and, therefore, can emulate it.

At this point, the duplicator is in exactly the same conditions as it is in accordance with the previous procedure after Step L), that is, it contains both the ID and the decrypted secret code.

Therefore, from this point on, the procedure continues exactly as in Steps N), O), P), Q), R) and S) described above, after having inserted the original key in the duplicator, of course.

In detail, and with reference to FIG. 3, the flow diagram for this perfected procedure is as follows:

A-1) the original key is inserted in the duplicator 4;

B-1) the duplicator emits a radio-electric signal which interrogates the original key;

C-1) the original key responds by emitting a radio-electric signal which contains its ID;

D-1) said ID is received and saved in the blank key;

E-1) the blank key is inserted in the vehicle lock and one or more attempts to start the vehicle are carried out (the reason for more than one attempt has already been explained above);

F-1) at every start attempt, the vehicle processing unit sends the blank key an electric signal which contains a random code encrypted by the algorithm which includes the secret code;

G-1) the blank key is taken out of the vehicle lock and inserted in the duplicator;

H-1) the duplicator, using calculation means and mathematical functions, in themselves known, decodes the secret code and saves it;

L-1) the blank key is removed from the duplicator;

M-1) the original key is inserted in the duplicator; From this point on, the procedure continues as from Step L) above, that is:

N-1) the duplicator interrogates the original key with an opportune radio-electric signal which contains the secret code, thereby emulating the functioning of the processing unit;

Step O-1) the original key responds by transmitting a new code of its own, that is, the PASSWORD;

Step P-1) the duplicator saves said PASSWORD;

Step Q-1) the original key is removed from the duplicator;

Step R-1) the blank key is inserted in the duplicator;

Step S-1) the duplicator transmits a radio-electric signal to said blank key, which includes the following: said PASSWORD, and the secret code; the ID, in fact, has already been transmitted and saved in the previous Steps C-1) and D-1).

Step T-1) the blank key saves said PASSWORD and the secret code in a defined memory.

Figure 3:
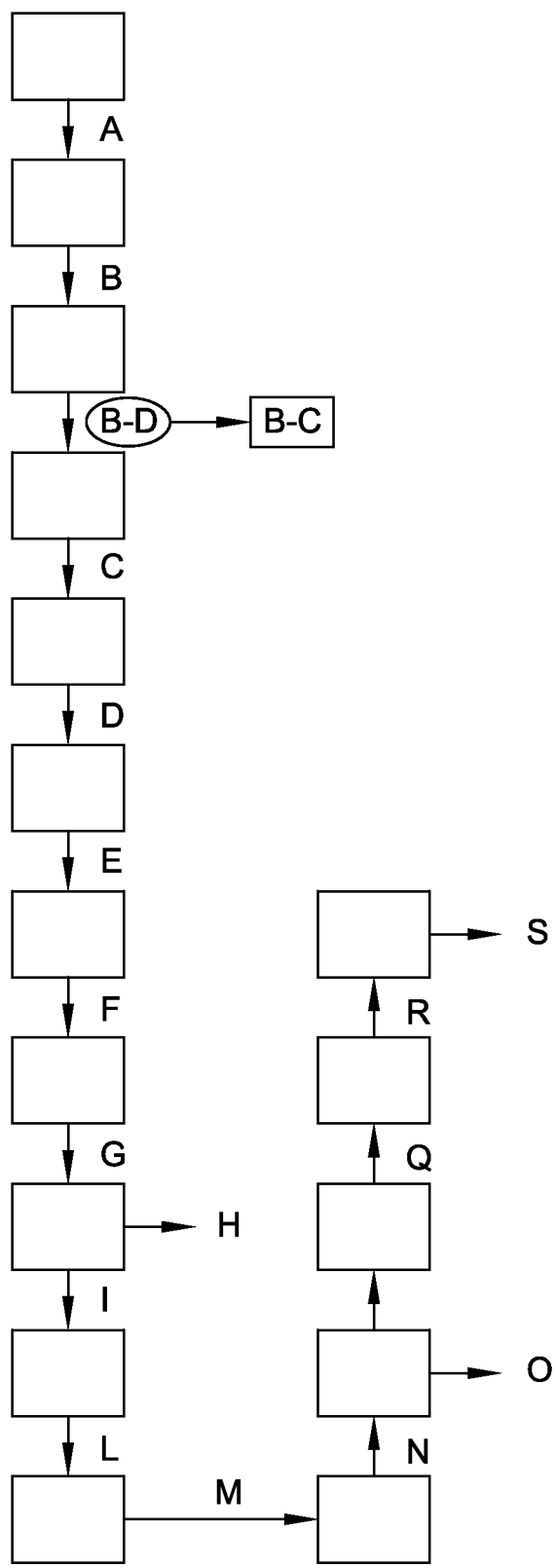
FIG. 3 illustrates a scheme for the relations between the various phases of the procedure in FIG. 2, and the relations between the various means taking part in each of these phases.
Figure 4:
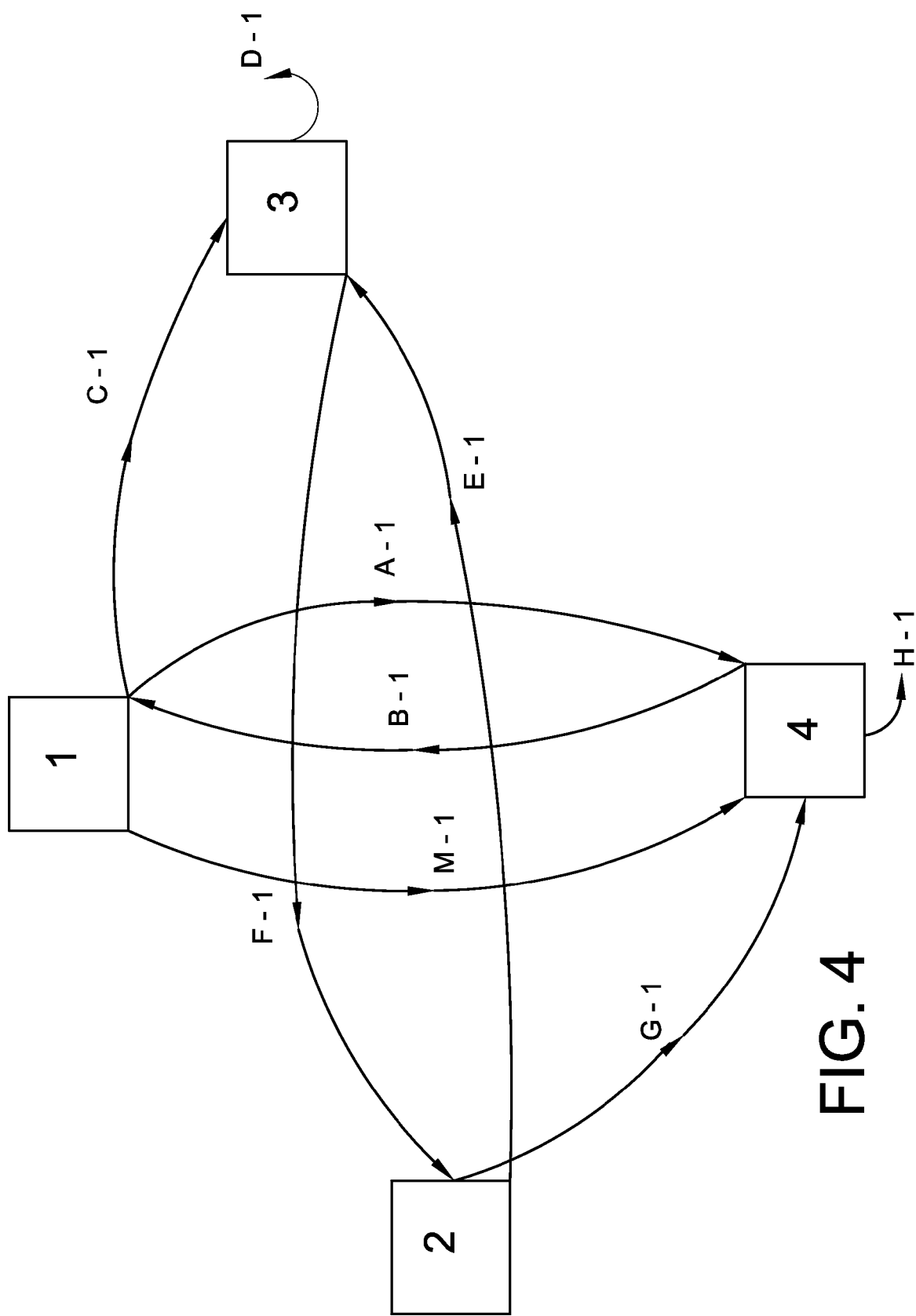
FIG. 4 illustrates a block diagram for the flow of the various phases of a perfected form of execution of the procedure in accordance with the invention.
Figure 5:
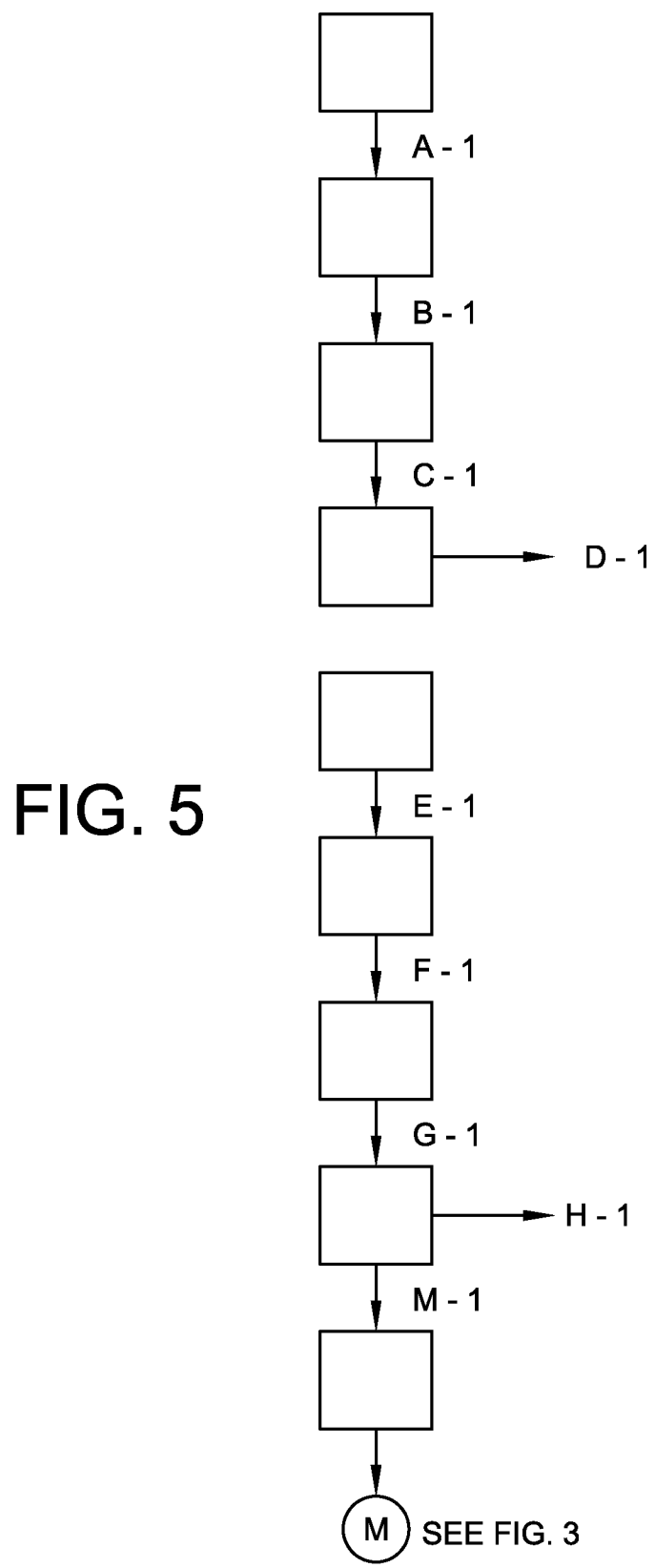
FIG. 5 illustrates a scheme for the relations between the various phases of the procedure in FIG. 4, and the relations between the various means taking part in each of these phases.
Figure 6:
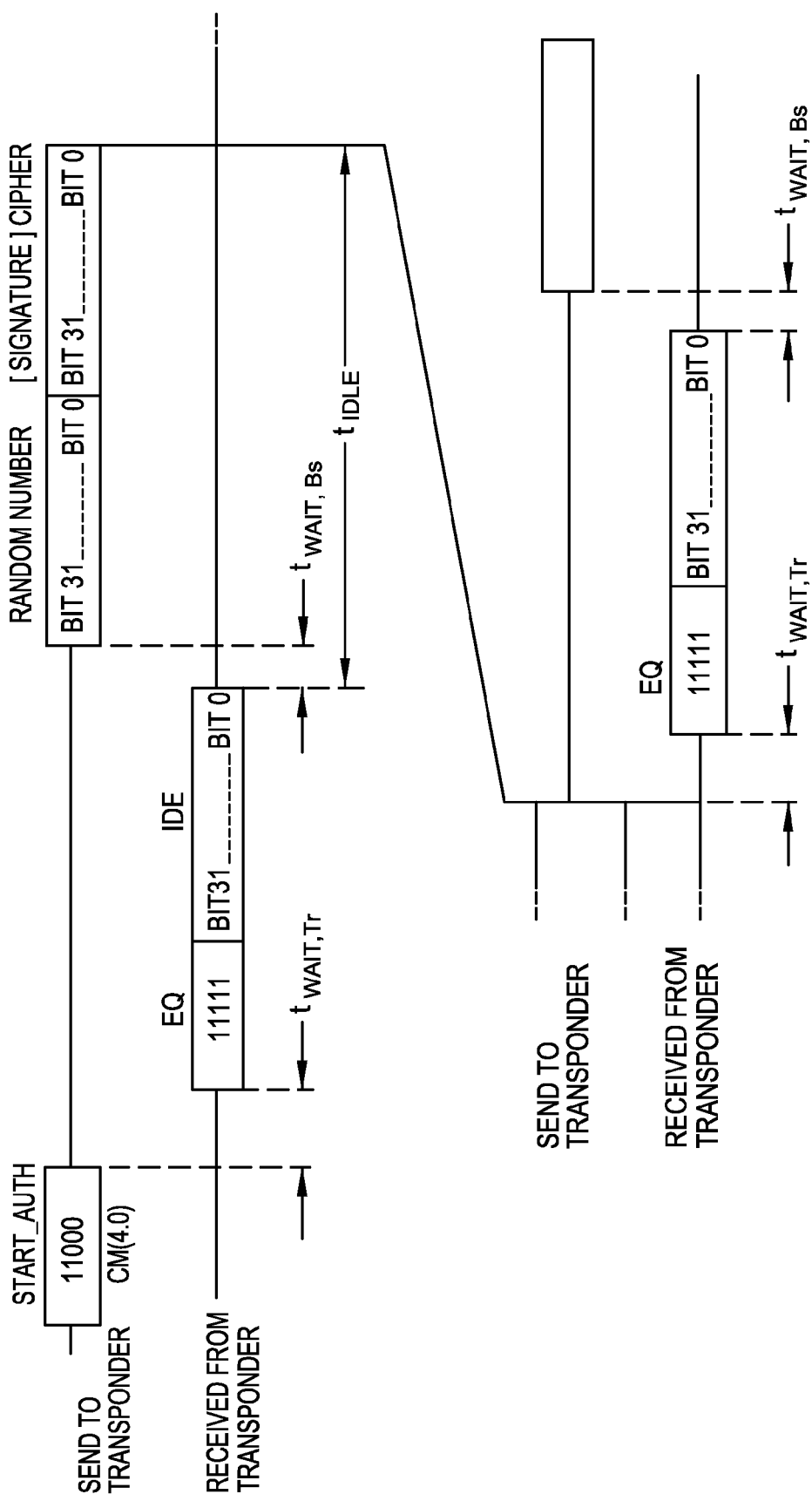
FIG. 6 illustrates a logical, schematized and symbolic scheme for the sequence of the functions and reciprocal relations between an electronic key and the relative unit, created to function in "mutual authentication" mode.

It will have been noted that the flow diagram for said FIG. 3 describes the phase only from the initial Step A-1) to Step M-1). In fact, after this phase, the procedure continues exactly as from Phase L) in FIG. 2, which is referred to, for the sake of brevity and greater clarity.

The invention claimed is:

1. A method for the duplication of original electronic keys, comprising:
    intercepting a radio-electric interrogating signal of an encrypted electronic authentication system transmitted between a central processing unit of a vehicle and an original key, the radio-electric interrogating signal including therein an encrypted random code generated by an algorithm, the encrypted random code including therein a secret code, the encrypted electronic authentication system utilizing an identification code (ID), the secret code, a password, and the algorithm;
    transferring said intercepted random code to a key duplicating device;
    decrypting said secret code from said random code at said key duplicating device;
    performing an interrogation process by transmitting a radio-electric signal, including said secret code, from said key duplicating device, to said original key;
    receiving the password, transmitted by said original key, at said key duplicating device in response to the transmission of the secret code;
    transferring said password to a blank key, the blank key including the algorithm and a data storage device configured to store an identification code (ID), a secret code and a password.

2. The method according to claim 1, wherein the radio-electric interrogating signal of the encrypted electronic authentication system is transmitted from the central processing unit of the vehicle to the original key in response to the receipt of the identification code ID from the original key.

3. The method according to claim 1, wherein the method further comprises, before the intercepting step, a step of obtaining the identification code (ID) from the original key.

4. The method according to claim 2, wherein the method further comprises, before the intercepting step, a step of obtaining the identification code (ID) from the original key.

5. The method according to claim 3, wherein the step of obtaining the identification code (ID) from the original key further comprises:
    interrogating the original key by transmitting a first radio-electric signal from said key duplicating device to the original key; and
    receiving a second radio-electric signal from the original key containing an identification code (ID).

6. The method according to claim 3, wherein the step of obtaining the identification code (ID) from the original key further comprises:
    intercepting a first radio-electric signal of an encrypted electronic authentication system transmitted between the original key and the central processing unit of the vehicle, the first radio-electric signal including therein the identification code (ID).

7. A method for the duplication of original electronic keys, comprising:
    intercepting, via an interception device placed in proximity to an original key, at least one radio-electric signal containing an identification code (ID) and an encrypted random code and storing the intercepted identification code (ID) and the encrypted random code in a storage of the interception device, the radio-electric signal being generated by an electronic authentication system of a vehicle performing authentication by
    transmitting, by a processing unit and in response to the activation of a central processing unit, the radio-electric signal including an identification request for the identification code (ID) of the original key, to the original key,
    transmitting, from the original key, the identification code (ID) stored in the original key to the central processing unit,
    comparing, at the central processing unit, the identification code (ID) with a previously stored corresponding ID code, and
    in response to a positive result from the comparing, generating, at the central processing unit, a random code encrypted by the algorithm, which includes the secret code, and sending the random code to the original key;
    transmitting, from interception device to a duplicator device, the intercepted identification code (ID) and the encrypted random code; and
    decrypting, at the duplicator device and using a series of mathematical functions and calculations, said encrypted secret code from the encrypted random code.

8. The method of claim 7, further comprising the step of
before the intercepting step, introducing the original key into a vehicle lock of the vehicle and rotating the original key, the rotation of the original key closing an electric circuit activating the central processing unit of the vehicle.

9. The method of claim 7, further comprising:
inserting the original key into the duplicator device;
interrogating the original key by transmitting a radio-electric signal which contains the secret code encrypted by the algorithm, thereby emulating functioning of the processing unit;
receiving, from the original key, a password in response to the transmission of the secret code;
storing the password received from the original key;
removing the original key from the duplicator device;
inserting a blank key into the duplicator device;
transmitting a radio-electric signal to said blank key containing the password, the secret code and the identification code ID; and
storing, in the blank key, the password, the secret code and the identification code ID within a defined memory.

10. A method for the duplication of original electronic keys, comprising:
a) interrogating an original key by transmitting a radio-electric signal from a key duplicating device to the original key inserted into the key duplicating device;
b) receiving a radio-electric signal from the original key containing an identification code (ID);
c) storing said identification code ID into a blank key;
d) receiving, at the blank key, in response to an attempt at ignition from the blank key inserted into a vehicle lock of a vehicle, and from a central processing unit of the vehicle, a radio-electric signal containing an encrypted secret code;
e) decrypting, at the key duplicating device, the secret code via computing and mathematical functions;
f) interrogating, at the key duplicating device, the original key with a radio-electric signal containing the secret code in order to emulate vehicle operation;
g) receiving, at the key duplicating device, a passcode from the original key in response to the interrogating;
h) transmitting, from the key duplicating device to the blank key, the passcode and the secret code; and
i) storing, into a defined memory of the blank key, the passcode and the secret code.

11. The method according to claim 10, wherein the method further comprises the steps of, before step e) and after step d),
removing the blank key from the vehicle lock; and
introducing the blank key into the key duplicating device.

12. The method according to claim 10, wherein the method further comprises the steps of, before step f) and after step e),
removing the blank key from the key duplicating device; and
introducing the original key into the key duplicating device.

13. The method according to claim 10, wherein the method further comprises the steps of, before step h) and after step g),
storing the passcode in the key duplicating device;
removing the original key from the key duplicating device; and
introducing the blank key into the key duplicating device.

14. The method according to claim 10, wherein the method further comprises the steps of, before step d) and after step c),
inserting the blank key into the vehicle lock of the vehicle; and
attempting ignition of the vehicle using the blank key one or more times.

15. The method according to claim 14, wherein the step of attempting ignition of the vehicle further comprises:
attempting ignition of the vehicle using the blank key three times.

* * * * *